Nov. 5, 1946.  E. A. ROCKWELL  2,410,750
HIGH-TO-LOW PRESSURE CONVERTER
Original Filed Jan. 4, 1940  2 Sheets-Sheet 1

INVENTOR
Edward A. Rockwell
BY
Arthur Wright
ATTORNEY

Nov. 5, 1946.  E. A. ROCKWELL  2,410,750
HIGH-TO-LOW PRESSURE CONVERTER
Original Filed Jan. 4, 1940  2 Sheets-Sheet 2
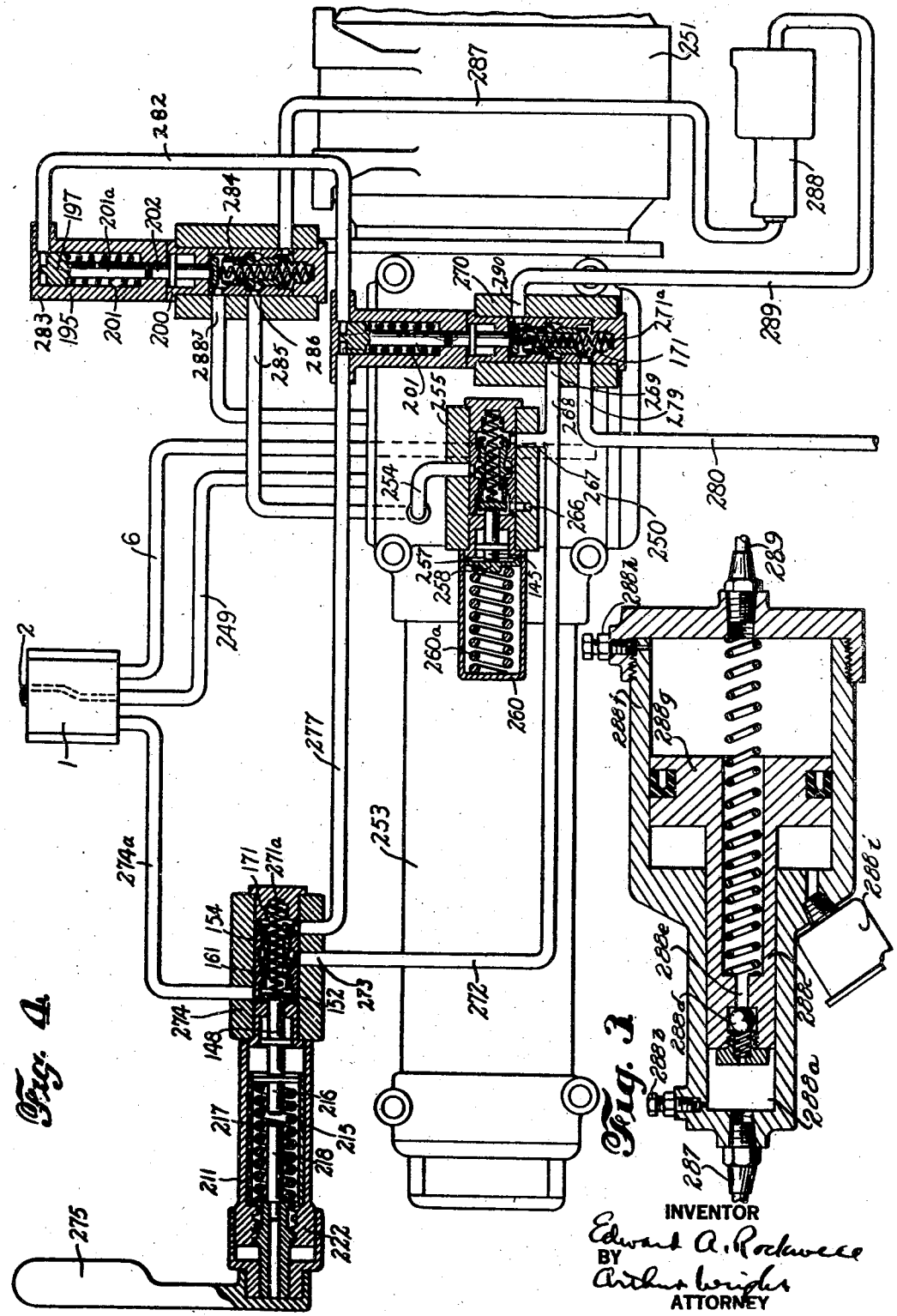
INVENTOR
Edward A. Rockwell
BY Arthur Wright
ATTORNEY Patented Nov. 5, 1946

2,410,750

UNITED STATES PATENT OFFICE 2,410,750

HIGH- TO LOW-PRESSURE CONVERTER

Edward A. Rockwell, Cleveland, Ohio, assignor to The New Britain Machine Company, New Britain, Conn., a corporation of Connecticut Original application January 4, 1940, Serial No. 312,356, now Patent No. 2,331,800, dated October 12, 1943. Divided and this application February 17, 1943, Serial No. 476,248. In Canada December 30, 1945

13 Claims. (Cl. 60—54.6)

My invention relates particularly to an apparatus designed for controlling the application of power for the operation of different parts or accessories of automotive vehicles, as, for example, automobiles, aeroplanes, railroad cars, mine locomotives, etc.

This application is a division of my co-pending application Ser. No. 312,356, filed January 4, 1940, upon System for controlling the application of power, Patent No. 2,331,800, granted October 12, 1943.

The object of my invention is to provide a system whereby the different parts of automotive vehicles may be operated in an advantageous manner so as to maintain adequate control over the same at all times. Another object is to provide an apparatus of this character, in accordance with which the part to be operated may be moved into position initially by means of a fluid applied at one pressure, and thereafter operated to cause the performance of work by said part by fluid at another pressure, this being accomplished, if desired, by various differentials between the pressures applied for moving said part and the manual or actuating pressures utilized for controlling the pressures so applied. My invention is adapted to be applied, not only for the operation of heavy-duty parts, as, for instance, on heavy trucks, requiring a considerable volume of pressure fluid for the operation of the same but also for the operation of relatively light parts on aeroplanes and other automotive vehicles, such, for instance, as light trucks, etc. Still another object is to provide an unloader valve. Another object is to provide a converter valve. Further objects of my invention will appear from the detailed description of the same hereinafter.

While my invention is capable of embodiment in many different forms, I have shown only certain embodiments thereof in the accompanying drawings, in which—

Fig. 3 is a transverse section of a converter from high to low pressure used in Fig. 1; and Fig. 4 is a diagrammatic representation of the circuit in Fig. 1.

Figure 1:
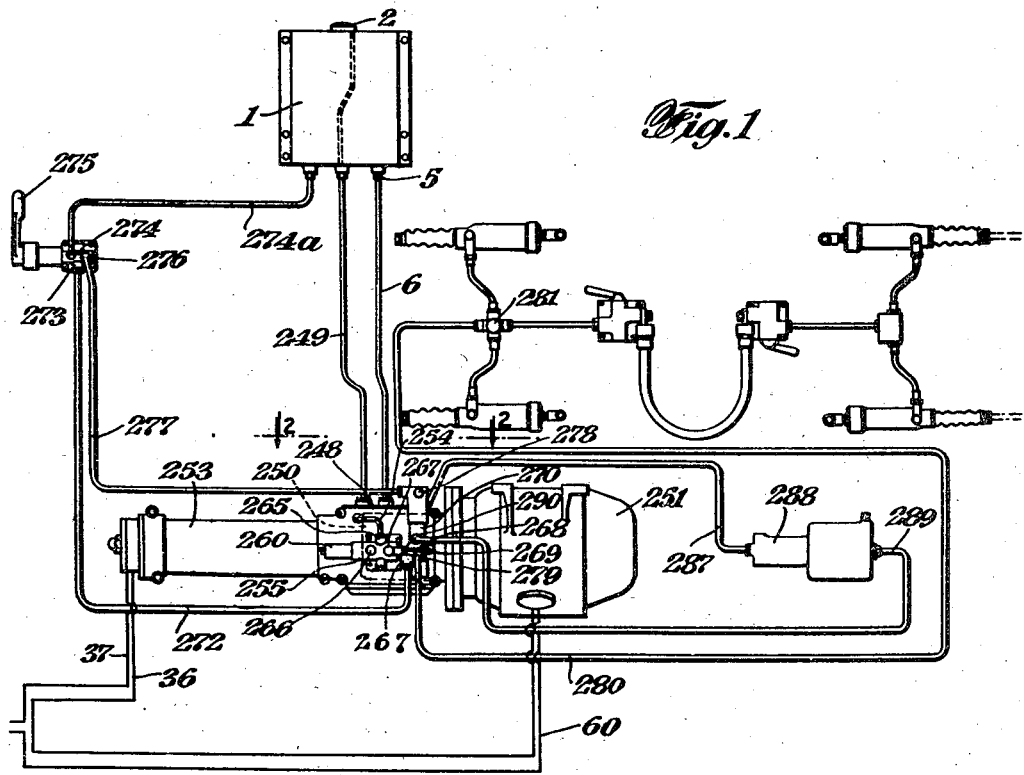
Fig. 1 is an elevation of a form of the system involving the manual application of high pressure to apply thereby a modulated low and then a high pressure.
Figure 2:
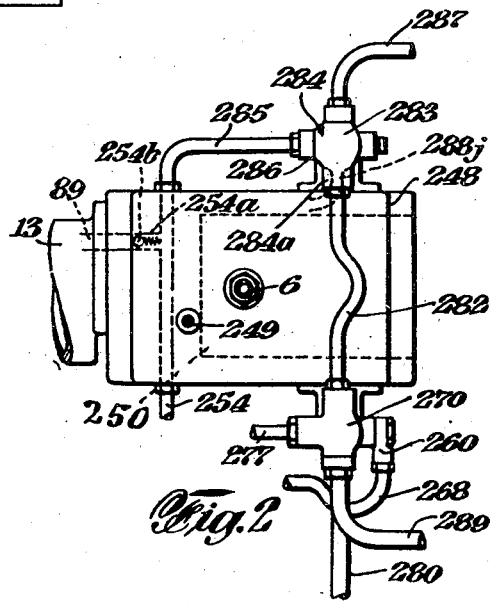
Fig. 2 is a plan view of a detail thereof, with parts in section on line 2—2 of Fig. 1.

The form of my invention shown in Figs. 1 and 2 is designed for heavy-duty operation and may be used, for example, in connection with the operation of mine locomotives or railway cars. This form of my invention is designed, furthermore, to modulate a regulated high pressure to produce a modulated low pressure for bringing the brakes into position preparatory to applying the braking force and thereafter to apply a modulated high pressure to said brakes for obtaining the braking force. In this form of my invention I have provided a reserve tank 1 having an outlet port 5 leading to a supply pipe 6. This supply pipe 6 communicates with a spillback tank 248 which has a vent pipe 249 leading up through the tank 1 beneath the cap 2 thereon. The vent pipe 249 opens from the top of the spillback tank 248. The pipe 6, however, continues inwardly into the latter to communicate with the inlet side of a rotary pump 250 which may be a gear pump and which is driven by an electric motor 251. This pump 250 is connected so as to deliver, by a port, the high pressure liquid to an accumulator 253 constructed with the same parts as described in connection with the accumulator 11, in said Patent No. 2,331,800, and has the same circuit connections to the electric motor as there described, except that a pressure of about 1500 lbs. per square inch is capable of being supplied thereby. The high pressure liquid thus accumulated in the accumulator 253 is delivered by a pipe 254 from a passageway 254a therein having a check valve 254b, to a regulator valve 255 for maintaining a definite pressure, which has a valve structure substantially the same as in the valve 137 in said Patent No. 2,331,800. This regulator valve 255 is connected by a port 265 to the pipe 254 from which the valve receives the pressure liquid delivered by the accumulator 253. The low pressure, or exhaust liquid, leave the valve 255 by a pipe 266 to return to the spill-back tank 248. In this valve structure the valve 152, 153 is normally closed by the spring 260a and the valve 166, 168 normally open and the compression of the spring 260a normally maintains the pressure of the liquid at a given desired pressure. When this pressure is exceeded the said two valves open and close, respectively, and the exhaust liquid passes out by the valve 152, 153. This construction produces a regulated pressure of approximately 1000 lbs. per square inch, which is delivered by the said valve 255 through a port 267 to a pipe 268 which then conveys it to a high pressure port 269 of a modulator valve 270, and which is constructed substantially the same as the modulator valve 137 in said Patent No. 2,331,800 except in this instance inside the spring 171 there is a light spring 271a, to normally keep the valve 152 open. On the side of said modulator valve 270 the pipe 268 has a connection which conveys the high pressure liquid by a pipe 272 to the high pressure port 273 of a hand-operated modulator valve 274 provided with a discharge pipe 274a leading to the reserve tank 1, and having a handle 275 to operate the same, all of which is constructed exactly like the said modulator valve 137. This handle 275 thus enables modulated high pressure to be delivered from a port 276 thereof by a pipe 277 to a delayed-action hydraulic modulator controlling device 278 constructed with a strong spring 201 therein which operates the said modulator valve 270 hydraulically according to the operation of the hand lever 275, but only after the brake shoes have been moved up into position. Thus, after the brakes have been moved up into braking position by a supply of modulated low pressure liquid thereto, as hereinafter described, the modulated high pressure liquid is discharged by the modulator valve 270 from a port 279 and thence by a pipe 280 to a brake operating mechanism connected to a pipe joint 281 to thus apply high pressure liquid for the braking effect. While the modulated high pressure liquid is thus delivered by the pipe 277 to the hydraulic element 278, a portion of this same liquid from the pipe 277, for preliminarily moving the brakes into position, passes by a pipe 282 to a hydraulic device 283 constructed the same as the device 278 except that in this instance a light spring 201 is used, and which in turn operates a modulator valve 284 constructed the same as the modulator valves previously described, as, for instance, said modulator valve 137. In this instance the high pressure liquid to be modulated by the hydraulic element 283 is received by a pipe 285 from the other side of the accumulator 253 and is thus received in a high pressure port 286 of the modulator valve 284 from which the modulated pressure liquid is delivered by a pipe 287 to the high pressure side of a high-to-low pressure converter 288. This is comprised of a small cylinder 288a, having a normally closed air bleeder 288b, in which there is a piston 288c with a check on unloader valve 288d. The check valve 288d is in a passageway 288e leading to a low pressure large cylinder 288f, having a piston 288g, and provided with an air bleeder 288h. An air filter 288i is on the cylinder 288f. The said modulator valve 284 is provided with a discharge or exhaust port 288j leading back to the spill-back tank 248. The low pressure side of the said low pressure converter 288 is connected by a pipe 289 to a low pressure port 290 in the modulator valve 270. This low pressure supplied through the port 290, due to the strong spring 201 keeping the valve 152 open in the initial operation of the brakes, permits the low pressure fluid to pass between the valve 152 and its seat and thence to the pipe 280 for the movement of the brake shoes up to the braking position. When the pressure in the pipe 280 has been applied to such an extent as to move the brake shoes into position, the increase in pressure within the pipe 277 will seat the valve 152 in the modulator valve 270 to permit the entry of high pressure liquid by the valve 167, thus supplying the high pressure liquid through the pipe 280 to apply the braking effect as previously described. The exhaust flow of liquid from the modulator valve 270 is received in the pipe 289. In this way a relatively high pressure may be used for applying a comparatively low pressure for the initial seating of the brakes, as, for instance, on mine locomotives or railway cars, while high pressure liquid is applied thereafter to the brakes to obtain the desired braking force.

In the form of my invention shown in Figs. 1, 2, 3 and 4, there is utilized a relatively high pressure which initially brings a relatively low pressure into action for setting the brakes into position, after which a modulated high pressure is applied for applying the braking force. In this instance, when the hand control modulator valve 274 is operated the high pressure liquid received by said valve from the pipe 272 is applied through the pipe 282 to the light spring hydraulic control 283 so as to modulatingly release the high pressure fluid received from the pipe 285 through the pipe 287 to the high pressure end of the high-to-low pressure converter 288 so as to thereby force out of the low pressure side of the same, through the pipe 289, a low pressure liquid which passes directly through the modulator valve 270 because the valve 152 is kept open at this stage by the strong spring control 278, 201, this low pressure liquid being thus delivered by the pipe 280 to the brakes to move the brake shoes initially into position. As the pressure applied increases in the pipe 277 this brings about no increased action on the part of the control 283 but acts to overcome the strong spring 201 in the control 278, thus closing the valve 152 and opening the valve 167 in the modulator valve 270, and thus supplying a modulated high pressure liquid through the pipe 280 to apply the braking force on the brake shoes. In this way any desired increments of increasing pressure, initially low and thereafter high pressure, can be applied for the operation of the brakes. In the off modulation of the valve 270 the liquid flows in the reverse direction in the pipe 289, and from the modulator valve 274 back to the reserve tank 1 through the pipe 274a and from the modulator valve 284 through the pipe 288j back to the spillback tank 248.

While I have described my invention above in detail I wish it to be understood that many changes may be made therein without departing from the spirit of the same.

I claim:

1. A pressure transformer comprising a hydraulic inlet, a hydraulic outlet line, a manually controlled member comprising a small piston and a large piston connected together for forcing liquid through said outlet line, a supply reservoir for said member and an unloader valve, seating in the same direction with the inlet and mounted in a passageway extending through said pistons to prevent by seating the flow of fluid from the inlet through said passageway and adapted to discharge the liquid from said line to said reservoir, operatively connected to the manually controlled member.

2. A construction, comprising a hydraulic line, a movable member, having a small piston and a large piston connected together, with the large piston nearer to said line, said member being controllable manually for forcing liquid therethrough, cylinders for said pistons, resilient means which moves said member away from said line when not being controlled manually, a source of supply of hydraulic liquid for said member, and a valve to normally cut off the liquid from the source of supply to said line and adapted to discharge the liquid from said line to said source of supply, operatively connected to the movable member.

3. A construction, comprising a hydraulic line, a movable member controllable manually by supplying hydraulic pressure to the member, for forcing liquid therethrough, a cylinder for the movable member, a source of supply of hydraulic liquid for said member, and a valve, seating in the same direction with the manually controlled hydraulic pressure to normally cut off the liquid from the source of supply to said line and adapted to discharge the liquid from said line to said source of supply, mounted on the movable member.

4. A construction, comprising a hydraulic line, a movable member, having a small piston and a large piston connected together, with the large piston nearer to said line, said member being controllable manually for forcing liquid therethrough, cylinders for said pistons, resilient means which moves said member away from said line when not being controlled manually, a source of supply of hydraulic liquid for said member, and a valve to normally cut off the liquid from the source of supply to said line and adapted to discharge the liquid from said line to said source of supply, mounted on the movable member.

5. A low pressure converter comprising a small cylinder, a large cylinder, pistons connected together to form a double piston to operate in said cylinders, resilient means which moves the pistons towards the small cylinder, a liquid supply inlet and outlet on the small cylinder at one end of the double piston, a valve movable with said pistons adapted to close in the same direction with said inlet of liquid, and an inlet for liquid in the large cylinder at the other end of the double piston, which has a passageway containing said valve passing through both said pistons.

6. A low pressure converter comprising a small cylinder, a large cylinder, pistons connected together to form a double piston adapted to operate in said cylinders, resilient means which moves the pistons towards the small cylinder, a liquid supply inlet and outlet on the small cylinder at one end of the double piston, a valve movable with said pistons, adapted to close in the same direction with said inlet of liquid, an inlet for liquid in the large cylinder at the other end of the double piston, and a breather opening in the large cylinder, having an air filter communicating therewith, located between the two pistons which have a passageway containing said valve passing through both said pistons.

7. A pressure transformer comprising a hydraulic line, a manually controlled member comprising a small and a large piston connected together for forcing liquid therethrough with the large piston nearer to the hydraulic line, resilient means which moves the pistons away from said line, a breather chamber between the pistons, a supply reservoir for said member and an unloader valve mounted in a passageway extending through said pistons and adapted to discharge the liquid from said line to said reservoir, operatively connected to the manually controlled member.

8. A construction, comprising a hydraulic line, a movable member controllable manually for forcing liquid therethrough, a cylinder for the movable member, a source of supply of hydraulic liquid for said member, and a valve to normally cut off the liquid from the source of supply to said line and adapted to discharge the liquid from said line to said source of supply, operatively connected to the movable member, said movable member comprising small and large pistons with the large piston nearer to the hydraulic line, resilient means which moves the pistons away from said line, and an intermediate breather chamber, said movable member being provided with a communicating passageway between the same containing said valve.

9. A construction, comprising a hydraulic line, a movable member, having a small piston and a large piston connected together, with the large piston nearer to said line, said member being controllable manually for forcing liquid therethrough, cylinders for said pistons, resilient means which moves said member away from said line when not being controlled manually, a source of supply of hydraulic liquid for said member, and a valve to normally cut off the liquid from the source of supply to said line and adapted to discharge the liquid from said line to said source of supply, operatively connected to the movable member, said pistons having a passageway containing said valve passing through both said pistons.

10. A construction, comprising a hydraulic line, a movable member controllable manually for forcing liquid therethrough, a cylinder for the movable member, a source of supply of hydraulic liquid for said member, and a valve to normally cut off the liquid from the source of supply to said line and adapted to discharge the liquid from said line to said source of supply, mounted on the movable member, said movable member comprising small and large pistons with the large piston nearer to the hydraulic line, resilient means which moves the pistons away from said line, and an intermediate breather chamber, said movable member being provided with a communicating passageway between the same containing said valve.

11. A construction, comprising a hydraulic line, a movable member, having a small piston and a large piston connected together, with the large piston nearer to said line, said member being controllable manually for forcing liquid therethrough, cylinders for said pistons, resilient means which moves said member away from said line when not being controlled manually, a source of supply of hydraulic liquid for said member, and a valve to normally cut off the liquid from the source of supply to said line and adapted to discharge the liquid from said line to said source of supply, mounted on the movable member, said pistons having a passageway containing said valve passing through both said pistons.

12. A low pressure converter comprising a small cylinder, a large cylinder, said converter being provided with a breather chamber, pistons connected together to form a double piston to operate in said cylinders, resilient means which moves the pistons towards the small cylinder, a liquid supply inlet and outlet on the small cylinder at one end of the double piston, a valve, movable with said pistons, adapted to close in the same direction with said inlet of liquid and an inlet for liquid on the large cylinder at the other end of the double piston, said double piston having a passageway containing said valve and passing through both said pistons.

13. A low pressure converter comprising a small cylinder, a large cylinder, said converter being provided with a breather chamber, pistons connected together to form a double piston to operate in said cylinders, resilient means which moves the pistons towards the small cylinder, a liquid supply inlet and outlet on the small cylinder at one end of the double piston, a valve, movable with said pistons, adapted to close in the same direction with said inlet of liquid, an inlet for liquid on the large cylinder at the other end of the double piston, and a breather opening for the breather chamber in the large cylinder located between the two pistons, said double piston having a passageway containing said valve and passing through both said pistons.

EDWARD A. ROCKWELL.